United States Patent [19]
Vanhook et al.

[11] Patent Number: 5,366,578
[45] Date of Patent: Nov. 22, 1994

[54] FITMENT FORMING PROCESS

[75] Inventors: William Z. Vanhook, Fort Mill; John T. Roberts, Clover, both of S.C.; Larry J. Mattson, Charlotte, N.C.

[73] Assignee: Robert Systems, Inc., Charlotte, N.C.

[21] Appl. No.: 93,310

[22] Filed: Jul. 16, 1993

Related U.S. Application Data

[63] Continuation of Ser. No. 807,157, Dec. 13, 1991, abandoned, which is a continuation-in-part of Ser. No. 676,267, Mar. 26, 1991, Pat. No. 5,134,765.

[51] Int. Cl.$^5$ .............................................. B29C 43/22
[52] U.S. Cl. ..................................... 156/245; 156/264; 156/308.4; 264/145; 264/151; 264/152; 264/155; 264/160; 264/210.1
[58] Field of Search ............... 264/145, 148, 151, 152, 264/154, 155, 160, 210.1; 156/308.4, 244.18, 244.24, 264, 245; 29/413, 417

[56] References Cited

U.S. PATENT DOCUMENTS

| | | | |
|---|---|---|---|
| 3,801,406 | 4/1974 | Debenedetti | 264/148 |
| 4,392,906 | 7/1983 | Hara | 156/264 |
| 4,447,479 | 5/1984 | Harrison et al. | 264/148 |
| 4,468,276 | 8/1984 | Membrino | 156/308.4 |
| 4,732,315 | 3/1988 | Gunn | 53/564 |
| 5,134,765 | 8/1992 | Roberts et al. | 264/148 |

*Primary Examiner*—Jill L. Heitbrink
*Attorney, Agent, or Firm*—Hardaway Law Firm

[57] ABSTRACT

A generally continuous strip of thermoplastic material is cold formed into a desired preformed configuration while retaining continuity with the generally continuous strip to form a chain of preformed configurations remaining continuous with the generally continuous strip of thermoplastic material. End portions of the chain are severed so as to form a cartridge of preformed configurations to be used in the formation of a cartridge of fitments.

4 Claims, 1 Drawing Sheet

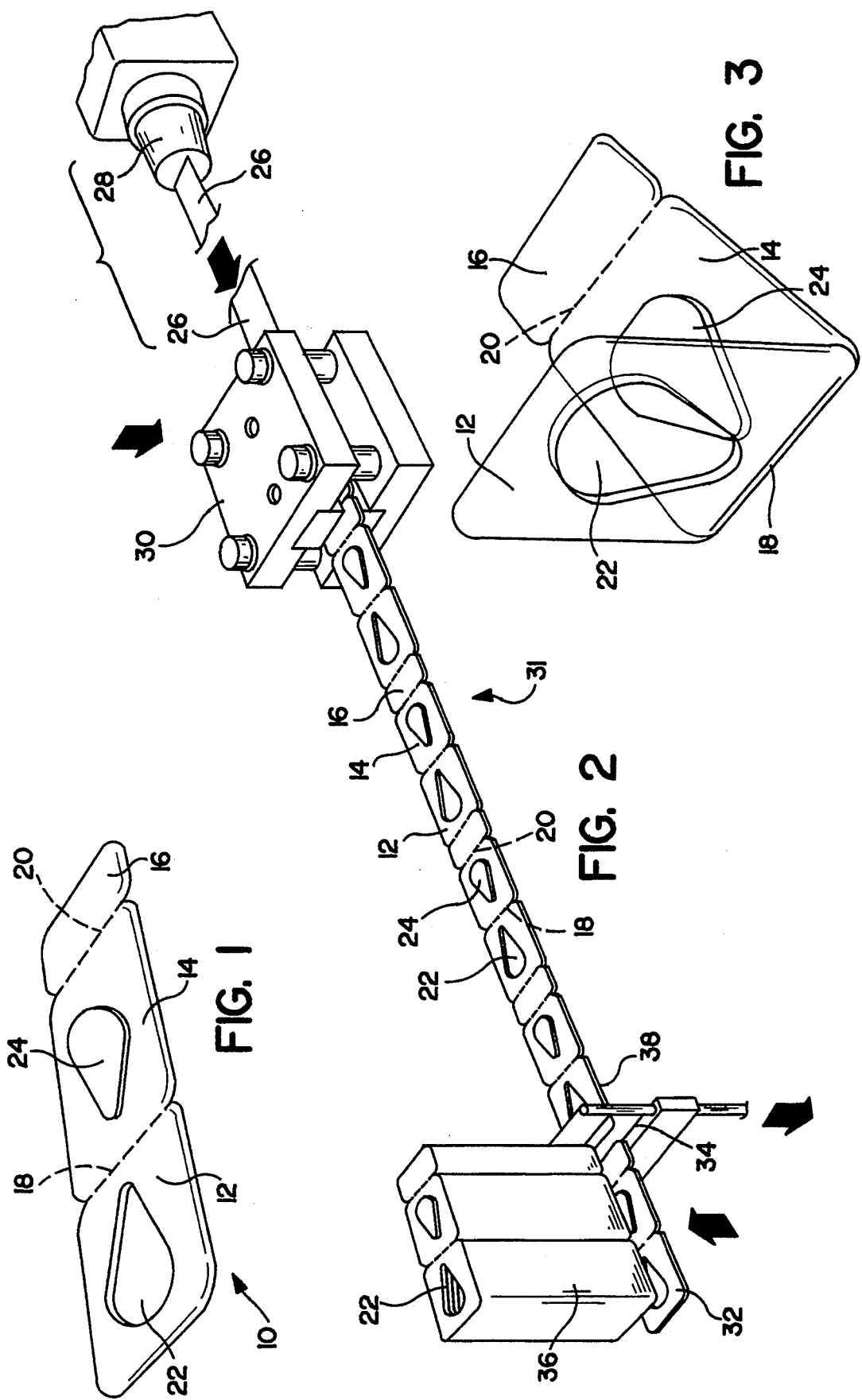

FITMENT FORMING PROCESS

CROSS REFERENCE TO RELATED APPLICATIONS

This application is a continuation of application Ser. No. 07/807,157, filed Dec. 13, 1991, now abandoned, which is a continuation-in-part of application Ser. No. 07/676,267 filed Mar. 26, 1991, now U.S. Pat. No. 5,134,765 issued Aug. 4, 1992.

BACKGROUND OF THE INVENTION

This invention relates to the art of dispensing, and more particularly to a process for forming a cartridge of plastic fitments for dispensing.

U.S. Pat. No. 4,193,959 discloses a method for embossing material such as plastic in the form of a sheet under controlled conditions. In one form, the embossing takes place while the plastic is confined and compressed between an endless sheet or belt and an extended area of the embossing surface of a drum. In another form, a fluent material such as a molten polymer is forced under pressure between an embossing roll and the surface of a sheet compressed against peripheral or border surfaces of the roll. U.S. Pat. No. 4,353,858 discloses a method for forming a boss upon a thermoplastic polymer surface by heating the surface to the temperature above the deformation temperature of the polymer and impressing the surface with a debossing die to form the portion of the article having the debossed region and raised ridges and introducing a liquid resin into the surface pattern followed by solidifying the resin to form the article having the boss. U.S. Pat. No. 4,732,315 discloses a dispensing package with a thin plastic fitment mounted over a cut out area in a closure flap of a seal and carton when the carton is in flattened tubular form. The plastic fitment is thermoformed and cut from thin sheet thermoplastic material.

While the prior art methods and apparatuses relating to fitments function well for their intended purposes, room for improvement exists in such pressure forming processes.

SUMMARY OF THE INVENTION

It is thus an object of this invention to provide a novel process for forming a cartridge of fitments.

It is another object of this invention to provide such a novel process for forming a cartridge of fitments from which a plurality of predetermined configurations may be dispensed.

It is another object of this invention to provide such a novel process for forming a cartridge of fitments of predetermined configurations which may be dispensed for attachment to containers.

It is a further object of this invention to provide such a novel process for forming a cartridge of fitments which provides such a cartridge wherein a plurality of forming steps are performed upon individual configurations prior to the formation of the cartridge of fitments.

These as well as other objects are accomplished by a process for forming a cartridge of fitments providing a continuous strip of thermoplastic material, applying pressure to an end portion of the strip while the strip is in cold form to deform the strip into a predetermined configuration with the strip retaining such predetermined configuration while retaining continuity with the continuous strip, repeating the step of deforming to form a plurality of predetermined configurations while retaining continuity of the predetermined configurations with the continuous strip to form a chain of predetermined configurations with the chain being generally continuous with the continuous strip of thermoplastic material, severing one of the predetermined configurations from the chain, continuing to sever the terminal predetermined configurations from the chain to form a plurality of terminated predetermined configurations, and stacking the terminated predetermined configurations to form a cartridge containing a plurality of terminated predetermined configurations.

BRIEF DESCRIPTION OF THE DRAWINGS

FIG. 1 of the drawings illustrates in perspective view a fitment formed in accordance with the present invention.

FIG. 2 of the drawings illustrates in schematic form the process of forming a cartridge of fitments in accordance with the present invention.

FIG. 3 of the drawings illustrates in perspective view a fitment in accordance with the present invention.

DETAILED DESCRIPTION

In accordance with this invention, it has been found that a cartridge of fitments may be formed of individual items which have very precise preformed configurations therein. It has further been found that this invention may be carried out from a continuous strip of material which has portions thereof preformed into a desired configuration prior to severance from the continuous strip such that upon the severance from an end of a preformed chain, a cartridge of fitments comprised of such preformed configurations may be formed therefrom. Various other advantages and features may become apparent from the following description given with reference to the various figures of drawings.

FIG. 1 of the drawings is a perspective view of a preferred configuration of a fitment 10 according to this invention. As illustrated, fitment 10 comprises a bottom portion 12, a middle portion 14 and a top portion 16. Bottom portion 12 and middle portion 14 have a hinge 18 formed therebetween in the preferred embodiment, and a second hinge 20 is also included in fitment 10 as hinge 20 connects middle portion 14 and top portion 16. An aperture 22 of predetermined configuration is defined within bottom portion 12 of fitment 10. Middle portion 14 defines a plug 24 therein which is designed to matingly engage with aperture 22 of bottom portion 12. In this manner, bottom portion 12, being pivotally connected by hinge 18 to middle portion 14, can be adjacently fitted against middle portion 14 with plug 24 fitting into aperture 22 of bottom portion 12.

The preformed configuration of a fitment such as fitment 10 according to this invention is formed by providing a continuous strip 26 of thermoplastic material. A high density polyethylene is preferably utilized in accordance with the invention, and preferably a recycled polyethylene. The continuous strip 26 is preferably provided by extrusion as is illustrated at 28 wherein the rough polymer is formed into a molten form extruded into the strip configuration which is formed upon the cooling thereof. Quite desirably, it has been found that an extrusion strip possesses the advantage of having a rounded edge which is absent upon a cut strip of material, thus the extruded strip is considerably more comfortable in the hand of the user because of the blunted edges thereof.

The generally continuous strip 26 of thermoplastic material moves along to a point where pressure is applied to a portion of strip 26 while strip 26 is in cold form to deform strip 26 into a predetermined configuration. Such pressure being applied to strip 26 is illustrated in FIG. 2 as dies 30 come together with strip 26 passing therebetween to deform an end portion of strip 26 into a predetermined configuration. Once the predetermined configuration is formed upon strip 26, strip 26 retains such predetermined configuration while also retaining continuity with continuous strip 26. The deforming step as performed by dies 30 illustrated in FIG. 2 is repeated to form a chain 31 consisting of a plurality of predetermined configurations while retaining continuity of the predetermined configurations with continuous strip 26. The step of applying pressure to an end portion of strip 26 is carried out while strip 26 is in cold form, a feature of the present invention which alleviates a need for heat in the deforming of strip 26 into a predetermined configuration.

Strip 26 may be deformed into a shape such as illustrated in FIG. 1 and illustrated in FIG. 2 as being a plurality of such predetermined configurations generally continuous with the thermoplastic material of strip 26. Such predetermined configurations comprise forming strip 26 into a bottom portion 12, a middle portion 14 and a top portion 16. Bottom portion 12 and middle portion 14 may be formed and connected by a hinge 18 formed into strip 26. Another hinge 20 is illustrated as being formed between top portion 16 and middle portion 14 of the predetermined configuration. Bottom portion 12 is formed so as to define an aperture 22, and middle portion 14 is deformed so as to define a plug 24 which matingly engages aperture 22 of bottom portion 12.

After all forming steps have been performed on strip 26 to form chain 31 consisting of a plurality of such predetermined configurations, the terminal configuration 32 may be severed from chain 31 so as to terminate chain 31 with a terminal predetermined configuration. Such step of severance is illustrated in FIG. 2 as occurring at 34. Terminal configuration 32 is thus available for stacking to form a cartridge of fitments 36. Generally upon severance from chain 31, terminal configuration 32 is simply moved up to become a part of cartridge 36 and to make way for the trailing preformed configuration 38 which is subsequently severed at 34.

The cartridge of fitments 36 may be formed to any desired height by adding additional individual preformed configurations such as configuration 32 to the bottom of cartridge of fitments 36. Such a cartridge of fitments 36 may be bonded so as to form an integral unit for loading into automatic package forming equipment. Thus, cartridge of fitments 36 may be utilized in automated dispensing equipment to dispense an individual preformed configuration from an end portion of cartridge of fitments 36.

FIG. 3 of the drawings is a perspective view of a preferred embodiment of a fitment 10 according to this invention. As illustrated, bottom portion 12 of fitment 10 is swung upward toward middle portion 14 defining plug 24 therein. Bottom portion 12 is movable in such a manner as a result of hinge 18 formed between bottom portion 12 and middle portion 14. Bottom portion 12 of fitment 10 defines an aperture 22 therethrough which is designed to matingly engage with plug 24 of middle portion 14. In this manner, bottom portion 12 can be fitted against middle portion 14 in a secured manner by the mating engagement of plug 24 with aperture 22 of bottom portion 12. In the embodiment illustrated according to this invention, bottom portion 12, when fitted against middle portion 14 with plug 24 in mating engagement with aperture 22, covers middle portion 14 up to hinge 20 and top portion 16 extends upward from middle portion 14 as top portion 16 is not covered by bottom portion 12 in this embodiment.

The mating engagement of plug 24 with aperture 22 of bottom portion 12 allows middle portion 14 to snap shut against bottom portion 12. This feature of fitment 10 makes fitment 10 ideal for attachment to a carton to operate as a means through which product inside the carton can pass. Access to such product can be through aperture 22, and middle portion 14 and plug 24 can snap shut against bottom portion 12 and aperture 22 to close such access to the carton.

It is thus seen that this invention provides a novel process for forming a cartridge of fitments. It is further seen that the novel process for forming a cartridge of fitments according to this invention provides a plurality of predetermined configurations which may be dispensed. It is still further seen that the process for forming a cartridge of fitments according to this invention provides such a cartridge wherein a plurality of forming steps are performed upon individual configurations prior to the formation of the cartridge of fitments. As many other variations will become apparent to those skilled in the art from a reading of the foregoing specification which is exemplary in nature, such variations are embodied within the spirit and scope of the present invention as measured by the following appended claims.

That which is claimed:

1. A process for forming a cartridge of fitments comprising the steps of:
   providing a generally continuous strip of thermoplastic material;
   applying pressure to an end portion of said strip while said strip is in cold form to deform a portion of said strip into a raised plug, said applied pressure further forming an aperture in said strip, said plug and said aperture being part of a predetermined configuration, said configuration retaining continuity with said generally continuous strip;
   repeating said step of applying pressure in cold form to deform said strip into a plurality of said plugs and further forming a plurality of apertures along said strip to form a chain of predetermined configurations with said chain being generally continuous with said generally continuous strip of thermoplastic material;
   severing one of said predetermined configurations from said chain to terminate said chain with a terminal predetermined configuration;
   continuing to sever the terminal predetermined configurations from said chain to form a plurality of terminated predetermined configurations; and
   stacking said terminal predetermined configurations to form a cartridge containing a plurality of said terminal predetermined configurations.

2. The process according to claim 1 further comprising the step of applying heat to said cartridge to bond said terminated predetermined configurations to adjacent configurations so as to provide a bonded cartridge.

3. The process according to claim 1 wherein said deforming step requires no removal of material.

4. The process according to claim 1 wherein said thermoplastic material is high density polyethylene.

* * * * *